Oct. 29, 1940.  G. J. DASHEFSKY  2,219,298
OPTICAL TORSIOGRAPH
Filed Sept. 6, 1938  3 Sheets-Sheet 1
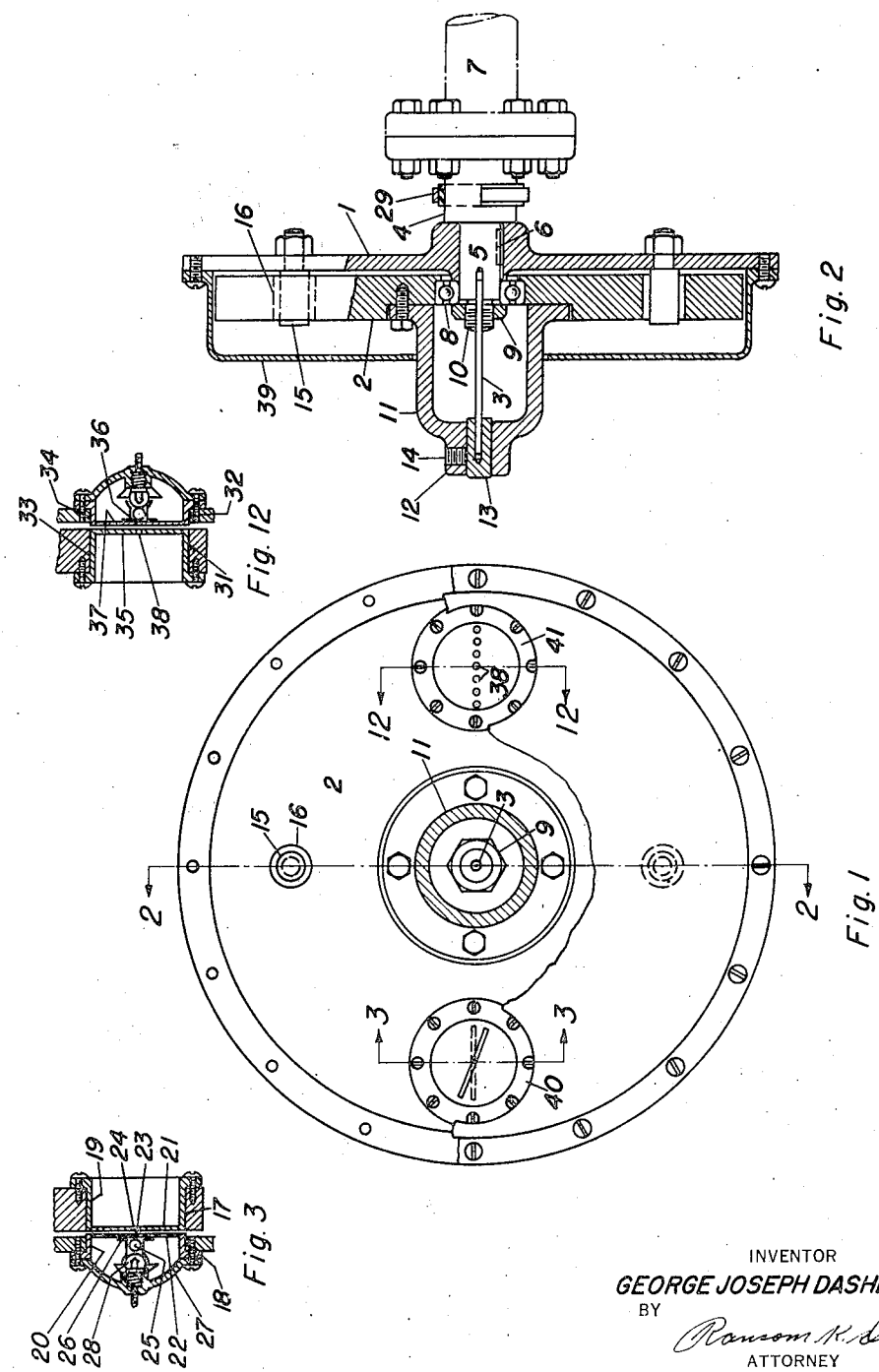
INVENTOR
GEORGE JOSEPH DASHEFSKY
BY
*Ransom K. Davis*
ATTORNEY Oct. 29, 1940.　　G. J. DASHEFSKY　　2,219,298
OPTICAL TORSIOGRAPH
Filed Sept. 6, 1938　　3 Sheets-Sheet 2
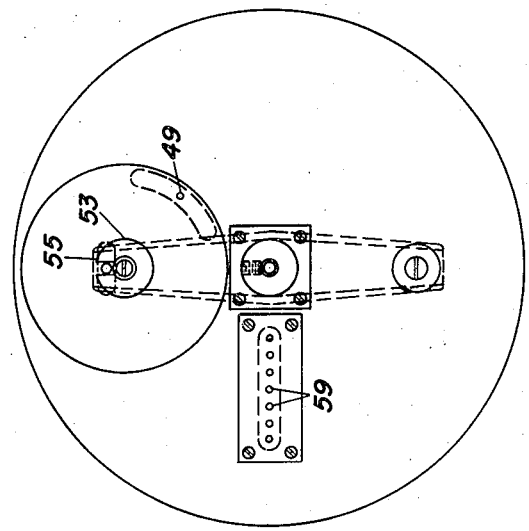
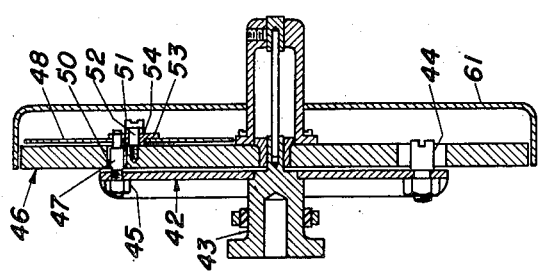
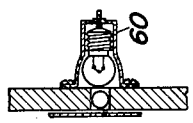
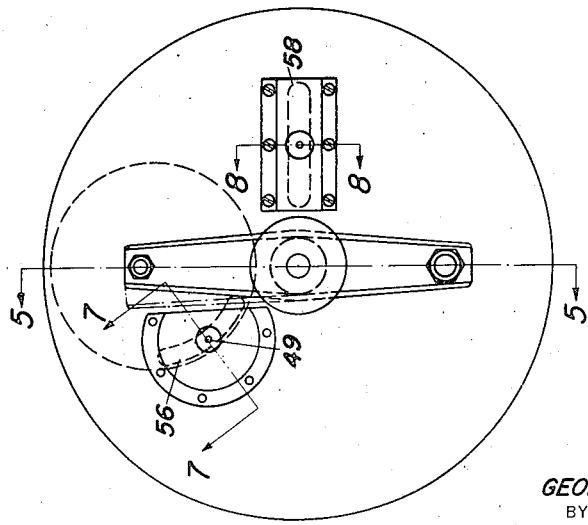
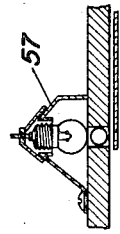
INVENTOR
GEORGE JOSEPH DASHEFSKY
BY
ATTORNEY Oct. 29, 1940.  G. J. DASHEFSKY  2,219,298
OPTICAL TORSIOGRAPH
Filed Sept. 6, 1938  3 Sheets-Sheet 3

INVENTOR
*GEORGE JOSEPH DASHEFSKY*
BY
*Ransom K. Davis*
ATTORNEY

Patented Oct. 29, 1940

2,219,298

UNITED STATES PATENT OFFICE 2,219,298

OPTICAL TORSIOGRAPH

George J. Dashefsky, Rockville Centre, N. Y.

Application September 6, 1938, Serial No. 228,621

15 Claims. (Cl. 73—51)

(Granted under the act of March 3, 1883, as amended April 30, 1928; 370 O. G. 757)

This invention relates to a device for producing a graphical representation of the torsional vibrations occurring in a rotating mechanism, such as a shaft.

It is an object of this invention to provide a simple, compact device which will show a repeating, cyclic, polar graph of such vibrations.

It is a further object of this invention to provide such a device which will be a permanent continuously operating part of the installation, the vibrations of which are to be indicated.

It is a further object of this invention to provide a means by which the phase, as well as the amplitude and order of the torsional vibration occurring in a rotating mechanism, may be readily determined.

The device of this invention should be of particular value in installations when continuous operation close to a critical speed is necessary, and where errors in tachometer operation may result in inadvertent operation at speeds at which a dangerous vibration exists, or where displacement of critical speeds may occur, due to slipping of a clutch, loosening of couplings, etc. It should also be valuable in installations equipped with vibration damping devices, where casualty to the damper may result in operation directly in a severe vibration formerly limited to a safe value.

Other objects of the invention will appear from a consideration of the following description, taken together with the accompanying drawings, in which:

Fig. 1 is a front elevational view of one embodiment of the invention, partly in section;

Fig. 2 is a side elevational view in section taken on the line 2—2 of Fig. 1;

Fig. 3 is a sectional view of a fragment of the embodiment of Fig. 1 taken on line 3—3 of that figure.

Fig. 4 is a front elevational view of another embodiment of my invention;

Fig. 5 is a side elevational view, in section, of the embodiment of Fig. 4, taken on line 5—5 of that figure;

Fig. 6 is a rear elevational view of the embodiment of Fig. 4;

Fig. 7 is a sectional view of a fragment taken along line 7—7 of Fig. 4;

Fig. 8 is a sectional view of a fragment taken along line 8—8 of Fig. 4;

Figure 10:
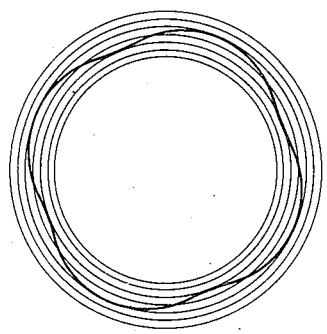
Figs. 10 and 11 are diagrammatic showings of two typical graphs produced by the device of the invention; and, Fig. 12 is a sectional view of a fragment of the embodiment of Fig. 1 taken on line 12—12 of that figure.

The device comprises two principal elements, the "fixed" and "flywheel" members connected together by a torque rod. In the embodiment of the device shown in Figs. 1, 2 and 3, the fixed member is 1, the flywheel member 2 and the torque rod 3. The member 1 is keyed at 6 to a reduced section 5 of a stub shaft 4 which is bolted to the flanged end of the shaft 7, the vibrations of which are to be indicated. The end of shaft section 5 supports a ball bearing on which is mounted the flywheel member 2. The bearing assembly is retained in place by a nut or keeper 9 threaded on a reduced end 10 of shaft section 5.

The member 2 has bolted thereto a cup shaped housing 11. The outer end of this housing has formed thereon a centrally located extension 12. This extension is formed with a central hole in which is fitted a cylindrical plug 13 to which is attached by soldering one end of the torque rod 3. The extension 12 has a tapped hole 14 formed therein in which may be screwed a set screw for the purpose of holding the plug 13 in any desired position. The other end of torque rod 3 is soldered into an axial hole in the end of shaft section 5. The member 1 has bolted thereto two lugs 15 which extend through holes 16 in member 2. These lugs are located on opposite sides of the center of member 1, as shown in Fig. 1. The holes 16 are of larger diameter than the lugs 15. This difference in size is considerable, allowing a limited degree of relative movement between members 1 and 2. The lugs 15 act as stops, preventing damage to the instrument due to excessive vibrations occurring in the shaft 7.

The fixed member 1 and the flywheel member 2 have formed therein near their peripheries round matching holes 17 and 18. These holes carry cup shaped assemblies 19 and 20, the base portions 21 and 22 of these cups being located in adjacent relation. The portion 22 of the assembly carried by fixed member 1 has formed therein a slot 23 which is radially directed with respect to member 1. The portion 21 of the assembly carried by flywheel member 2 has formed therein a spiral slot 24, the central portion of which lies opposite the central portion of slot 23 when members 1 and 2 are at rest. A glass rod 25 is clamped against the rearward side of slot 23 by means of clamp 26. The cup shaped assembly 20 has secured to its rearward edge a dome shaped housing 27 which carries a lamp 28. The lamp 28 is located in adjacent relation to glass rod 25 so that the light therefrom will be focused by glass rod 25 onto the slot 23. The spiral slot 24 is such that the change in radius at any point in the curve is proportional to the angular displacement of the point from the center of the curve. Current for the lamp is taken from a slip ring 29 secured to shaft section 4 by means of a single wire 30, the other terminal of the lamp being grounded.

Located in a position diametrically opposite the holes 17, 18, are two similar holes 31, 32, carrying cup shaped assemblies 33 and 34, similar to 19 and 20, the assembly 34 being carried by fixed member 1 and the assembly 33 being carried by flywheel member 2. The bottom portion 37 of assembly 34 has formed therein a radial slot 36 similar to slot 23. The bottom portion 35 of assembly 33 has formed therein a series of radially extending equally spaced holes 38. A lamp and glass rod similar to those described above illuminates slot 36. The glass rod has, preferably, a different color from that described above.

Bolted to fixed member 1 is a housing 39 which has formed therein windows 40 and 41, allowing a clear view of assemblies 19 and 31.

The operation of the device of the embodiment shown in Figs. 1, 2, 3 and 12 is as follows:

As long as no torsional vibration exists in shaft 7 the slots 23, 24, will intersect in the mean position and the spot of light showing through the intersection will, by virtue of the rotation of the discs and the phenomenon of retinal inertia, or persistence of vision, appear to the observer as a thin, circular band of light. The rotation of the holes 38 will produce a series of concentric bands of light of a different color, due to the use of the colored glass rod in assembly 34. The circular band of light produced by the rotation of the intersection of slots 23, 24, will be superimposed on that band of light produced by the rotation of the central one of holes 38.

If a vibration occurs in shaft 7 the fixed member 1 carried by the shaft executes the same vibrations as the shaft. The flywheel member 2 carried by ball bearing 8 and torque rod 3, due to its inertia, tends to move with uniform angular velocity and thus to give rise to relative angular displacement between the two members, in proportion to the vibration encountered. These relative angular displacements are translated into a proportional linear radial displacement of the illuminated area, formed by the intersection of the radial and spiral slots in the respective flywheel and fixed members. As the device is viewed, the illuminated spot will indicate the vibration form in a polar diagram, superimposed on the concentric circular bands of light formed by the rotation of holes 38. The order of vibration (number of vibrations per engine revolution) as well as the magnitude is shown directly, while the engine is in motion.

Figure 11:
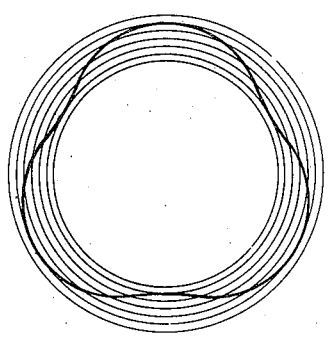

Two typical vibration patterns are shown in Figs. 10 and 11. Since the vibration is related to the engine cycle, the number of vibrations indicated per revolution will depend on whether the engine is of the 2 or 4 stroke cycle type. Fig. 10 shows the pattern formed by a vibration of the fourth order, while Fig. 11 shows the pattern formed by a vibration of the third order. The amplitude of the vibration is indicated by the number of concentric colored circles covered by the graph. Thus the vibration of Fig. 10 has an amplitude of ±1°, while that of Fig. 11 has an amplitude of ±2°.

Figs. 4 to 8 illustrate a second embodiment of my invention. In this embodiment the assemblies carrying the intersecting radial and spiral slots have been replaced by a lever operated disc with a small hole arranged to provide the moving point of light. The fixed member of the first described embodiment has been replaced by a beam 42 fixed to a stub shaft section 43. One arm of this beam carries a lug 44 acting as a stop in the manner similar to the stops of the previously described embodiment. The opposite end of the beam carries a rod 45 bolted thereto, and passing through a slot 50 in flywheel member 46. The slot 50 has its longitudinal axis extending at right angles to the radius of flywheel member 46, thus allowing a considerable movement of rod 45 relative to the flywheel member. This rod has an enlarged central section 47 which, however, is of smaller diameter than the width of the slot 50 in the flywheel member. The flywheel member 46 has pivotally attached thereto at a point adjacent the rod 45 a disc 48 formed with a hole 49 located near its periphery. The attachment of the disc is accomplished as follows:

A pin 51 is screwed into a hole in flywheel member 46. The pin has an enlarged portion 52 on which is carried for rotation with respect thereto a collar 53. The disc 48 is seated on a sleeve portion 54 of collar 53. The collar 53 has formed therein a radial slot 55 and disc 48 has a similar slot positioned so as to coincide with slot 55. The extreme end of rod 45 extends through both of said slots. The purpose of the slots is to accommodate the relative radial movement of rod 45 with respect to pin 51 which occurs when beam 42 is deflected to one side of its neutral position. An arcuate slot 56 is formed in flywheel member 46 and arranged so as to lie opposite the path of travel of hole 49 in disc 48. Secured on the rearward face of flywheel member 46 is a lamp housing 57 similar to that described in the previous modification.

Flywheel member 46 is also provided with a radial slot 58 against the forward side of which is superimposed a plate having formed therein a radial line of spaced holes 59, and behind which is a lamp housing 60, shown in Fig. 8, similar to those previously described.

A housing 61 is bolted to flywheel member 46 and carries windows exposing to view the various spots of light.

The operation of this embodiment is similar to that of the embodiment previously described. The displacement of hole 49 occurs in approximately a radial direction. The beam 42 corresponds in action to the fixed member of the previous embodiment.

Figure 9:
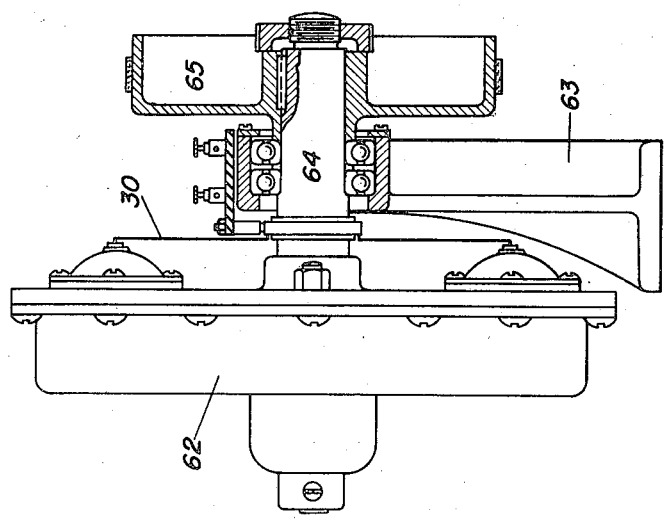
Fig. 9 is a side elevational view of either of the embodiments previously shown, but adapted for belt drive.

The two embodiments previously described have been arranged for direct connection to the end of the shaft in which vibrations are to be measured. Fig. 9 shows an arrangement of the torsiograph mounted for belt drive for use in installations where the end of the shaft is not accessible for the purpose of mounting the torsiograph. The torsiograph assembly is mounted on a support 63 by means of a shaft 64 mounted in ball bearings in said support. On the end of the shaft 64 is fixedly mounted a pulley 65 preferably of the same diameter as that of the shaft to be studied. The use of a pulley of a diameter different from that of the shaft to be studied will result in a diagram which is non-repetitive.

This figure clearly shows the arrangement of the slip ring and brush which act as a means of providing a source of current for the lamps employed in the torsiograph.

In using this device at very low speeds the phenomenon of persistence of vision may not be sufficiently magnified and it may not be possible to see the whole of the polar diagram. What this lower speed limit is can only be determined experimentally since intensity of illumination is also a factor. However, for very low speeds it is possible to use a special phosphorescent photographic plate, known as a "luminograph" plate, an example of which is disclosed in U. S. Patent No. 1,910,573, issued May 23, 1933, to Elias T. Tal. This type of plate may be exposed to the light coming from the optical torsiograph with the result that a temporary glow image will be produced, where the points of light pass over the sensitive plate. Since the image traced is repetitive, the time of exposure may be regulated to give a suitable glow image. This image will be temporary, the glow disappearing in a short time, and the plate made ready for registering further images.

There are other means of obtaining a copy of the vibration diagram produced by the torsiograph. For example, the diagram may be photographed by the use of an ordinary camera. An image of the diagram may be projected on a ground glass screen by the use of a suitable camera lens and the resulting image may be traced in pencil on the screen or may be measured and studied thereon.

When such information is important, the phase of a vibration relative to the engine cycle may be determined with the aid of a stroboscope. A vertical radial line is marked on the torsiograph, when the engine is on top center. The stroboscope is arranged to flash once each engine cycle, at the moment when an arbitrarily chosen cylinder reaches firing top center. The phase of the vibration is thus immediately apparent.

When using a direct-coupled torsiograph, the stroboscope may be dispensed with by observing the following procedure:

Select a reference point on the shaft and secure the torsiograph so that the radial slot lies in the radial plane containing the reference point. When using the torsiograph with perforated disc, as described above in the second emembodiment, the instrument should be attached so that the radial line passing through the hole in the disc when in its position of rest, lies in the radial plane containing the reference point. With the torsiograph secured in this manner, the vibration pattern is automatically related to the reference point on the shaft.

When using the belt-driven torsiograph, stroboscopic means may be advantageously utilized. A neon flash lamp may be built into the lamp housing and a contactor on the shaft arranged to flash the lamp at any desired reference position of the shaft. This red flash of the neon lamp will be superimposed on the vibration pattern and the phase of the vibration indicated with regard to the selected reference point.

The description of the invention has been restricted to two embodiments. However, it will be readily seen by one skilled in the art that the invention may be incorporated in various other embodiments. The scope of the invention is not to be restricted by the modifications shown but only by the scope of the following claims.

The invention described herein may be manufactured and/or used by and for the Government of the United States of America for governmental purposes without the payment of any royalties thereon or therefor.

Having thus set forth and disclosed the nature of this invention, what is claimed is:

1. A device for producing a visual representation of torsional vibrations occurring in a rotating element of a mechanism, comprising, a first member constrained to rotate in a fixed relation to the rotating element, and subject to the same torsional vibrations as occur therein, a second member of disk-like form flexibly connected to said first member and normally rotating therewith but free of torsional vibrations occurring therein, a disk pivotally supported on said second member and having an aperture formed therein, means on said first member eccentrically engaging said disk and producing in it a limited rotative motion proportional to relative movement between said two members, said aperture being so located as to describe a path the central portion of which is tangent to a radius of said second member, and means for projecting light through said aperture.

2. A device for producing a visual representation of torsional vibrations occurring in a rotating element of a mechanism, comprising, means producing a series of equally spaced concentric bands of light, means producing a circular band of light superimposed on and centrally located with respect to said series of light bands as long as the rotating element is free of torsional vibrations, and means for causing said last named band of light to assume a wave form in accordance with torsional vibrations occurring in the rotating element, and thus to provide a repetitive, cyclic, polar curve of said vibrations.

3. A device for producing a visual representation of torsional vibrations occurring in a rotating element of a mechanism, comprising, a first member constrained to rotate in a fixed relation to the rotating element, and subject to the same torsional vibrations as occur therein, a second member flexibly connected to said first member and normally rotating therewith but free of torsional vibrations occurring in said first member, means to produce a series of equally spaced spots of light along a radius of said second member, means to produce a spot of light visible through said second member and having the same radial distance as the center of said group of light spots, and means controlled by said first member for varying the radial distance of said spot of light in accordance with torsional vibrations occurring in said first member.

4. A device for producing a visual representation of torsional vibrations occurring in a rotating element of a mechanism, comprising, a first disk-like member constrained to rotate in a fixed relation to the rotating element, and subject to the same torsional vibrations as occur therein, a second disk-like member flexibly connected to said first member and normally rotating therewith but free of torsional vibrations occurring therein, said second member having a row of equally spaced apertures located along a radius thereof, means for projecting light through said row of apertures, said first member having a radially extending slot formed therein, the center of said slot having the same radial distance as the center of said group of apertures, said second member having a spiral slot formed therein, said spiral slot so located that its center point normally lies opposite the center of said radial slot, means for projecting light through the intersection of said slots, whereby when torsional vibrations occur in said first member the position of said intersection will be radially moved in accordance with said vibrations and the light projected through said intersection will appear as an endless wavy line superimposed on a series of concentric circular light bands.

5. A device for producing a visual representation of torsional vibrations occurring in a rotating element of a mechanism, comprising, a first member constrained to rotate in a fixed relation to the rotating element, and subject to the same torsional vibrations as occur therein, a second member of disk-like form flexibly connected to said first member and normally rotating therewith but free of torsional vibrations occurring therein, a disk pivotably supported on said second member and having an aperture formed therein, means on said first member eccentrically engaging said disk and producing in it a limited rotative motion proportional to relative movement between said two members, said aperture being so located as to describe a path the central portion of which is tangent to a radius of said second member, said second member having a series of equally spaced apertures formed therein and lying along a radius thereof, and means for projecting light through each of said apertures.

6. A device for producing a repetitive, cyclic, polar graph of torsional vibrations occurring in a rotating element of a mechanism, comprising, a first member rotating in a fixed relation to the rotating element, means axially supporting said member, a torque flexible rod extending axially from said supporting means, a second member fixed to the free end of said rod, said second member having an aperture therein for the passage of light, a light source located adjacent said two members, means to project light through said aperture and means controlled by said first member to radially control with respect to said second member and in accordance with torsional vibrations occurring in said first member the passage of light projected through said aperture.

7. A device for producing a visual representation of torsional vibrations occurring in a rotating element of a mechanism, comprising, a first member, means axially supporting said member, constraining it to rotate in a fixed relation to the rotating element, and subjecting it to the same torsional vibrations as occur therein, a torque flexible rod attached at one end to said supporting means and extending axially therefrom, a second member fixed to the free end of said rod, means to produce a series of equally spaced spots of light along a radius of said second member, means to produce a spot of light visible through said second member and having the same radial distance as the center of said group of light spots, and means controlled by said first member for varying the radial distance of said spot of light in accordance with torsional vibrations occurring in said first member.

8. A device for producing a visual representation of torsional vibrations occurring in a rotating element of a mechanism, comprising, a first disk-like member, means axially supporting said member, constraining it to move in a fixed relation to the rotating element, and subjecting it to the same torsional vibrations as occur in said rotating element, a torque flexible rod fixed at one end to said supporting means and extending axially therefrom, a second disk-like member fixed to the free end of said rod, said second member having a row of equally spaced apertures located along a radius thereof, said first member having a radially extending slot formed therein, the center of said slot having the same radial distance as the center of said group of apertures, said second member having a spiral slot formed therein, said spiral slot being so located that its center point normally lies opposite the center of said radial slot, and means for projecting light through the intersection of said slots and through said apertures, whereby when torsional vibrations occur in said first member the position of said intersection will be radially moved in accordance with said vibrations.

9. A device for producing a visual representation of torsional vibrations occurring in a rotating element of a mechanism, comprising, a first member, means axially supporting said member, constraining it to rotate in a fixed relation to the rotating element and subjecting it to the same torsional vibrations as occur therein, a torque flexible rod fixed at one end to said supporting means and extending axially therefrom, a second member of disk-like form fixed to the free end of said rod, a disk pivotally supported on said second member and having an aperture formed therein, means on said first member eccentrically engaging said disk and producing in it a limited rotative motion proportional to relative movement between said two members, said aperture being so located as to describe a path the central portion of which is tangent to a radius of said second member, and means for projecting light through said aperture.

10. A device for producing a visual representation of torsional vibrations occurring in a rotating element of a mechanism, comprising, a first member, means axially supporting said member, constraining it to rotate in a fixed relation to the rotating element and subjecting it to the same torsional vibrations as occur therein, a torque flexible rod fixed at one end to said supporting means and extending axially therefrom, a second member of disk-like form fixed to the free end of said rod, a disk pivotally supported on said second member and having an aperture formed therein, means on said first member eccentrically engaging said disk and producing in it a limited rotative movement proportional to relative movement between said two members, said aperture being so located as to describe a path the central portion of which is tangent to a radius of said second member, said second member having a series of equally spaced apertures formed therein and lying along a radius thereof, and means for projecting light through each of said apertures.

11. A device for producing a repetitive, cyclic, polar graph of torsional vibrations occurring in a rotating element of a mechanism, comprising, a shaft-like element constrained to rotate with said rotating element and subject to the same torsional vibrations, a first member fixed on said shaft-like element, a second member journalled on said shaft-like element, said second member having an aperture therein for the passage of light, a torque flexible rod fixed at one end to said shaft-like element and extending axially therefrom, a connecting means fixed to the free end of said rod and extending symmetrically therefrom to said second member, a light source located adjacent said two members, means to cause said light source to project light through said aperture in said second member and means controlled by said first member to radially control with respect to said second member and in accordance with torsional vibrations occurring in said first member the passage of light projected through said aperture.

12. A device for producing a visual representation of torsional vibrations occurring in a rotating element of a mechanism, comprising, a shaft-like element constrained to rotate with said rotating element and subject to the same torsional vibrations, a first disk-like member fixed on said shaft-like element, a second disk-like member journalled on said shaft-like element, a torque flexible rod fixed at one end to said shaft-like element and extending axially therefrom, a connecting means fixed to the free end of said rod and extending symmetrically therefrom to said second member, means to produce a series of equally spaced spots of light along a radius of said second member, means to produce a spot of light visible through said second member and having the same radial distance as the center of said group of light spots, and means controlled by said first member for varying the radial distance of said spot of light in accordance with torsional vibrations occurring in said first member.

13. A device for producing a visual representation of torsional vibrations occurring in a rotating element of a mechanism, comprising, a shaft-like element constrained to rotate with said rotating element and subject to the same torsional vibrations, a first disk-like member fixed on said shaft-like element, a second disk-like member journalled on said shaft-like element, a torque flexible rod fixed at one end to said shaft-like element and extending axially therefrom, a connecting means fixed to the free end of said rod and extending symmetrically therefrom to said second member, said second member having a row of equally spaced apertures located along a radius thereof, said first member having a radially extending slot formed therein, the center of said slot having the same radial distance as the center of said group of apertures, said second member having a spiral slot formed therein, said spiral slot being so located that its center point normally lies opposite the center of said radial slot, and means for projecting light through the intersection of said slots and through said apertures, whereby when torsional vibrations occur in said first member the position of said intersection will be radially moved in accordance with said vibrations.

14. A device for producing a visual representation of torsional vibrations occurring in a rotating element of a mechanism, comprising, a shaft-like element, a second member of disk-like said rotating element and subject to the same torsional vibrations, a first member fixed on said shaft-like element, a second member of disk-like form journalled on said shaft-like element, a torque flexible rod fixed at one end to said shaft-like element and extending axially therefrom, a connecting means fixed to the free end of said rod and extending symmetrically therefrom to said second member, a disk pivotally supported on said second member and having an aperture formed therein, means on said first member eccentrically engaging said disk and producing in it a relative motion proportional to relative movement between said two members, said aperture being so located as to describe a path the central portion of which is tangent to a radius of said second member, and means for projecting light through said aperture.

15. A device for producing a visual representation of torsional vibrations occurring in a rotating element of a mechanism, comprising, a shaft-like element constrained to rotate with said rotating element and subject to the same torsional vibrations, a first member fixed on said shaft-like element, a second member of disk-like form journalled on said shaft-like element, a torque flexible rod fixed at one end to said shaft-like element and extending axially therefrom, a connecting means fixed to the free end of said rod and extending symmetrically therefrom to said second member, a disk pivotally supported on said second member and having an aperture formed therein, means on said first member eccentrically engaging said disk and producing in it a limited rotative movement proportional to relative movement between said two members, said aperture being so located as to describe a path the central portion of which is tangent to a radius of said second member, said second member having a series of equally spaced apertures formed therein and lying along a radius thereof, and means for projecting light through each of said apertures.

GEORGE J. DASHEFSKY.